UNITED STATES PATENT OFFICE.

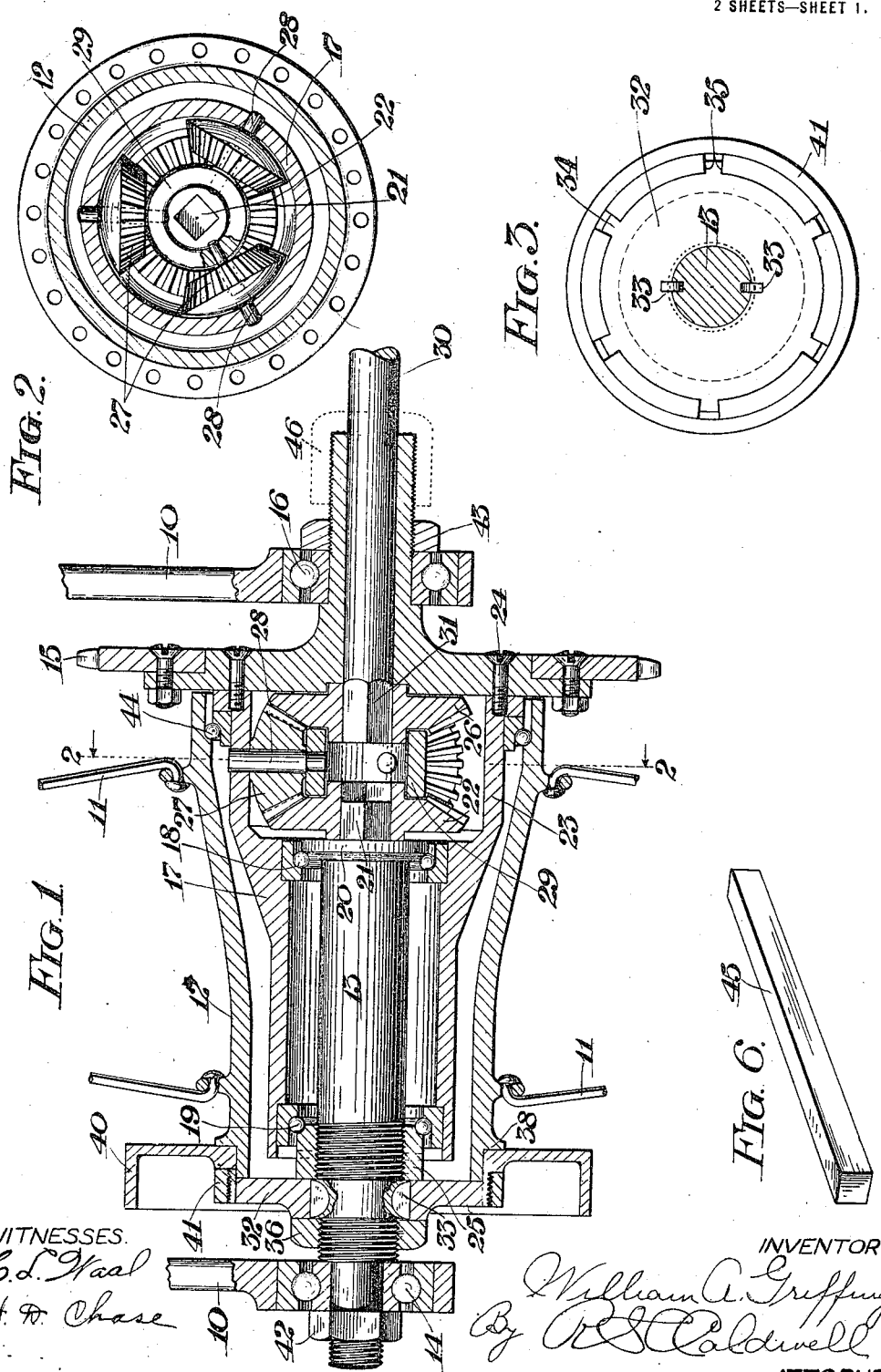

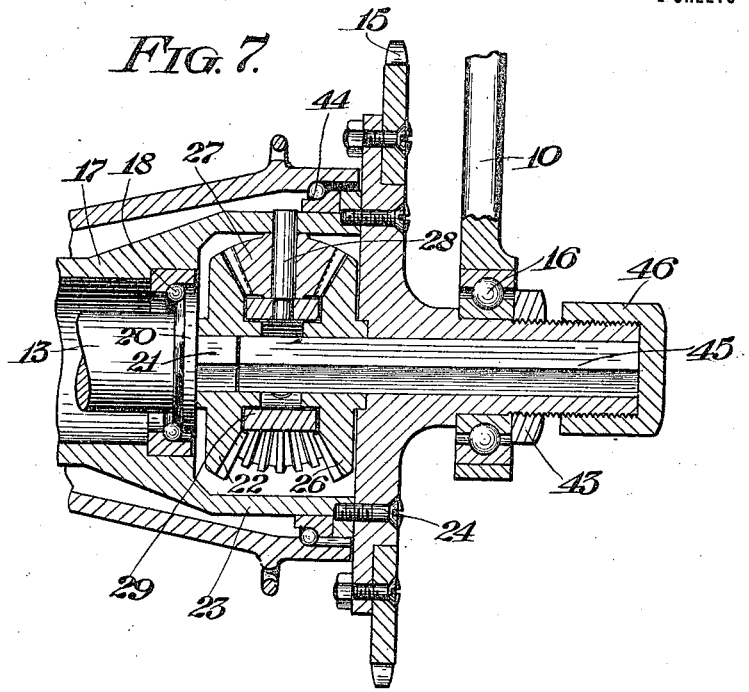
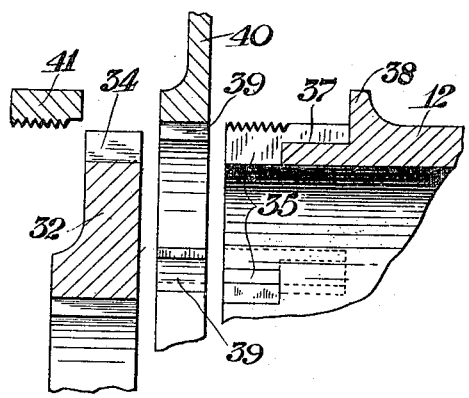
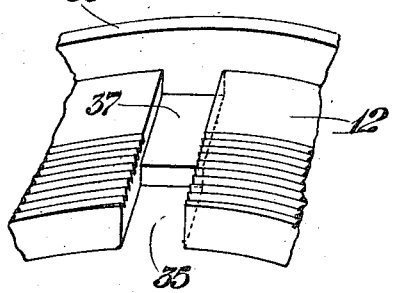

WILLIAM A. GRIFFING, OF PORTLAND, OREGON.

DIFFERENTIAL GEAR FOR MOTORCYCLES.

1,322,689.

Specification of Letters Patent. Patented Nov. 25, 1919.

Application filed August 19, 1918. Serial No. 250,504.

*To all whom it may concern:*

Be it known that I, WILLIAM A. GRIFFING, a citizen of the United States, and resident of Portland, in the county of Multnomah and State of Oregon, have invented new and useful Improvements in Differential Gears for Motorcycles, of which the following is a description, reference being had to the accompanying drawings, which are a part of this specification.

This invention has for its object to provide a differential gear for motorcycles that will permit of the wheel of the side car constituting a traction wheel, thereby relieving the side strain that is present when the driving is done with the motorcycle wheel only.

Another object of the invention is to provide such a differential gear that will be able to drive the motorcycle drive wheel when the side car is removed.

With the above and other objects in view the invention consists in the differential gear for motorcycles as herein claimed and all equivalents.

Referring to the accompanying drawings in which like characters of reference indicate similar parts in different views:

Figure 1 is a sectional view through the hub of the rear wheel of a motorcycle equipped with the differential gear of this invention;

Fig. 2 is a sectional view thereof on the plane of line 2—2 of Fig. 1;

Fig. 3 is an end view showing the hub shell connection with the shaft and the brake drum;

Fig. 4 is a detail view of these parts separated;

Fig. 5 is a perspective view of a fragment of the hub shell; and

Fig. 6 is a perspective view of the square shaft used for keying the members of the differential gear together when the side car is removed;

Fig. 7 is a sectional view like Fig. 1 with the side car shaft removed.

In these drawings 10 indicates the rear fork of the frame of a motorcycle and 11 the drive wheel mounted therein. The wheel hub comprises a shell 12 keyed on an axle 13 having a ball bearing 14 in one arm of the rear fork 10. A sprocket wheel 15 has a ball bearing 16 in the other arm of the rear fork 10 and also a tubular extension 17 with ball bearings 18 and 19 on the axle 13.

The axle 13 is provided with an annular flange 20 to form the cone of ball bearing 18, and a square end 21 to form a key connection for a beveled gear 22 in the cylindrical gear housing 23 formed at the end of the tubular extension 17 where it is attached to the sprocket wheel 15 by means of screws 24. A nut 25 threaded on the axle 13 forms the cone for the other ball bearing 19.

Another beveled gear 26 is contained in the gear housing 23 with its hub portion loosely mounted in a recess in the face of sprocket wheel 15. Beveled pinions 27, of which there are three shown, are loosely mounted on pins 28 projecting inwardly from the walls of the gear housing 23. A ring 29 connects the inner ends of the pins 28 and surrounds the hubs of the gear wheels 22 and 26. The beveled pinions 27 form planetary gears turned by the sprocket wheel and operating differentially on the beveled gear wheels 22 and 26 which are connected respectively to the rear wheel 11 of the motorcycle and the side car wheel not shown. The axle 30 of the side car wheel is loosely mounted through the hub of the sprocket wheel 15 and its end 31 is squared to fit within a correspondingly shaped opening in the beveled gear 26 so as to form a driving connection therewith. The driving connection between the gear wheel 22 and the motorcycle wheel 11 includes the connection between said gear wheel 22 and the square end 21 of axle 13, and also a key connection between the axle 13 and the hub shell 12. This key connection is formed by a disk 32 connected by keys 33 with the axle 13 and provided with regularly spaced lugs 34 at its outer edge fitting in corresponding notches 34 in the edge of the hub shell 12. A nut 36 threaded on axle 13 clamps the key disk 32 in place against nut 25. The notches 35 in the edge of the hub shell 12 may be continued as grooves 37 extending to an annular flange 38 for the purpose of receiving inwardly projecting key lugs 39 of a brake drum 40 which is slipped over the end of the hub shell 12 and is held against the flange 38 by a nut ring 41 threaded on the hub shell.

The axle 13 may be mounted in its bearing by having its reduced shouldered end fitting within the inner ring of the bearing 14 with a nut 42 threaded on it to clamp said ring against the shoulder. Likewise the projecting tubular hub of the sprocket wheel 15 may have the inner ring of the bearing 16 clamped against its shoulder by a nut 43 threaded thereon.

The tubular extension 17 on the sprocket wheel 15 not only has its spaced ball bearings 18 and 19 on the axle 13, but has a ball bearing 44 with the end of the hub shell 12 next to the sprocket wheel.

In operation the differential gearing of this invention enables both the motorcycle wheel 11 and the side car wheel on axle 30 to be driven by the turning of the sprocket wheel 15 or through a corresponding driving member, thus increasing the traction and avoiding the side strain present when driving with the motorcycle wheel alone. When it is desired to disconnect the side car, the driving shaft 30 is withdrawn and is substituted by a square key shaft 45 which, however, fits within the square opening of beveled gear 22 as well as that of beveled gear 26 and so locks them together. The key shaft 45 prevents relative movement between the beveled gears 22 and 26 and compels them to turn together with the sprocket wheel. In order to retain the key shaft 45 in place a cap 46 may be threaded on the hub of the sprocket wheel.

In accordance with the provisions of the patent statutes I have described the principle of operation of my invention together with the apparatus which I now consider to represent the best embodiment thereof; but I desire to have it understood that the apparatus shown is only illustrative and that the invention can be carried out by other means within the scope of my claims.

What I claim as new and desire to secure by Letters Patent is:

1. In a motorcycle, a differential gear having one member connected with the driving mechanism, another member connected with the driving wheel, and another member adapted for connection with a side car wheel.

2. A motorcycle wheel hub, containing a differential gear with one member connected with the wheel hub, another member connected with the driving mechanism, and another member adapted for connection with the wheel of a side car.

3. In a motorcycle; a differential gear having one member connected with the driving means, another member connected with the traction wheel, another member adapted for connection with a side car wheel; and means for locking two of the members together when the side car is not in use.

4. In a motorcycle differential gear, a wheel hub member mounted on an axle journaled in one fork member, a driving member mounted in the other fork member and having a tubular extension thereon fitting between the hub member and its axle, and forming a gear housing, planetary gears carried by the walls of the gear housing, a gear mounted on the axle meshing with the planetary gears, and a gear also meshing with the planetary gears and adapted to have the axle of a side car wheel connected therewith.

5. In a motorcycle, a differential gear having one member connected with the motorcycle traction wheel and the other member detachably connected with a side car axle, and means for connecting said members of the differential gear together when the side car axle is removed.

6. In a motorcycle, a differential gear including a pair of gear wheels having angular openings, a motorcycle traction wheel connected with one of said gear wheels, a side car axle removably fitting in the angular opening of the other gear wheel, and an angular rod adapted to fit in the angular openings of both gear wheels when the side car axle is removed.

7. In a motorcycle, an axle member rotatably mounted in one member of the rear fork of the motorcycle frame, a driving member similarly mounted in the other member of the rear fork, a tubular extension on the driving member surrounding the axle member, a flange and a nut on the axle member, ball bearings between them and the tubular extension, a beveled gear wheel secured to the axle member and provided with a square opening, a similar beveled gear wheel, beveled pinions mounted in the tubular extension and meshing with the beveled gear wheels, a side car axle having a square end removably fitting in the second beveled gear wheel, a square shaft fitting in the square openings of both beveled gear wheels when the side car axle is removed, a cap threaded on the end of the driving member to retain the square shaft in place, and a traction wheel with its hub surrounding the tubular extension and having a roller bearing thereon at one end and a key connection with the axle member at the other end.

8. In a motorcycle, an axle member rotatably mounted in one member of the rear fork, a driving member similarly mounted in the other member of the rear fork and having a tubular extension thereon having roller bearings between it and the axle member, a differential gear within the tubular extension having planetary pinions carried by the tubular extension and a beveled gear wheel connected with the axle member and another beveled gear wheel, a side car axle having connection with the said other beveled gear wheel, a motorcycle traction wheel with its hub shell surrounding the tubular extension and having a roller bearing therewith at one end and notches at the other end, a brake drum surrounding the hub shell and provided with lugs entering the notches of the hub shell, and a key disk keyed on the axle member and having lugs fitting in the notches of the hub shell.

9. In a motorcycle, an axle member rotatably mounted in one member of the rear fork, a driving member rotatably mounted in the other member of the rear fork, a side car axle, a differential gear driven by the driving member and driving the axle member and the side car axle, a motorcycle drive wheel having a hub shell inclosing the differential gear and with a bearing at one end and a flange and notches at the other end, a brake drum fitting on the hub shell against the flange and provided with lugs entering the notches of the hub shell, a key disk keyed on the axle member and provided with lugs fitting in the notches of the hub shell, and a nut ring threaded on the end of the hub shell and bearing against the brake drum.

10. In a motorcycle, the combination, with the rear wheel and its driving means, of the side car shaft, and a driving connection between said shaft and said driving means.

11. In a motorcycle, the combination, with the rear wheel and its driving means, of a detachable side car shaft and a driving connection between said shaft, and said driving means.

In testimony whereof, I affix my signature, in presence of two witnesses.

WM. A. GRIFFING.

Witnesses:
PEARL GARLAND,
H. W. GARLAND.